(12) United States Patent
Linthicum

(10) Patent No.: US 6,305,885 B1
(45) Date of Patent: Oct. 23, 2001

(54) HOLE ENLARGEMENT APPARATUS

(76) Inventor: Leo Linthicum, 1088 Collins Rd., Colorado Springs, CO (US) 80920

(*) Notice: Subject to any disclaimer, the term of this patent is extended or adjusted under 35 U.S.C. 154(b) by 0 days.

(21) Appl. No.: 09/603,100

(22) Filed: Jun. 26, 2000

(51) Int. Cl.[7] ............ B23B 35/00; B23B 51/04
(52) U.S. Cl. ............ 408/1 R; 408/80; 408/204; 408/201
(58) Field of Search ............ 408/80, 81, 82, 408/95, 201, 204, 1 R, 68

(56) References Cited

U.S. PATENT DOCUMENTS

| | | | |
|---|---|---|---|
| 3,266,345 | * | 8/1966 | Weisner et al. .......... 408/201 |
| 4,749,315 | * | 6/1988 | Mills .......... 408/80 |
| 4,968,189 | * | 11/1990 | Pidgeon .......... 408/80 |
| 5,413,437 | * | 5/1995 | Bristow .......... 408/80 |
| 5,871,310 | * | 2/1999 | Morternsen .......... 408/204 |
| 6,048,141 | * | 4/2000 | Freeman .......... 408/201 |

* cited by examiner

Primary Examiner—Daniel W. Howell
(74) Attorney, Agent, or Firm—G. F. Gallinger

(57) ABSTRACT

A hole enlargement apparatus which uses a simple spring biased disc to center a larger hole cutter in the existing hole and a disc retention means to ensure that the disc does not fall unretrievably into the enlarged hole. The apparatus is used in conjunction with a conventional large hole cutter of the type having a toothed cylindrical cup, a hub axially secured in a bottom portion of the cup, and a pilot bit axially and removably secured through the hub and cup. The hole enlargement apparatus comprises: a guide member having a disc portion dimensioned to matingly fit within the existing hole, a rim portion connected to a rear portion of the disc portion adapted to seat on the workpiece, and a disc center guide opening dimensioned to slidingly accept a shaft the diameter of the pilot bit; a drill bit replacement shaft having a hub end portion and an opposite disc end portion; a cotter pin carried by the disc end portion of the drill replacement shaft to prevent the guide member from sliding off the disc end portion of the shaft; and, a spring to bias and maintain the disc portion in the existing hole.

11 Claims, 1 Drawing Sheet

HOLE ENLARGEMENT APPARATUS

FIELD OF THE INVENTION

This invention relates to the problem of guiding a hole cutter when enlarging an existing hole. More particularly this invention relates to the use of a simple disc which centers the larger hole cutter in the existing hole and a disc retention means which ensures that the disc does not fall unretrievably into the enlarged hole.

BACKGROUND OF THE INVENTION

The inventor is an electrician who has been involved in residential construction and remodelling. When the need arises to enlarge an existing hole some means of maintaining the pilot drill in the center of the existing hole must be provided for.

There are a number of relatively elaborate devices to center a pilot drill in an existing hole. Compared to a simple disc, which can only partially slide into an existing hole, these are expensive to manufacture and heavy to carry around. The problem with a simple disc however, is that if it is used to enlarge an existing hole in a wall—once the hole is cut, the disc, together with the round cut out piece may fall down into the wall where it cannot be recovered. Another problem with a simple disc is that it is difficult to hold in an existing hole while cutting. When a large diameter hole is being cut it is common for the cutting teeth to catch in the workpiece twisting the drill out of axial alignment in the hands of the user. When cutting in wood it is not uncommon to break pilot bits. When cutting in sheetrock the result is an enlarged pilot hole and a roughly cut hole.

U.S. Pat. No. 5,871,310 issued to R. Mortensen discloses the use of a tapered dowel plug. One problem with the tapered dowel plug is that it may vibrate loose in sheetrock or other workpieces. In other workpieces if it is able to be jammed into the existing hole sufficiently so that it does not vibrate or wrench free during the cutting process, then it must be subsequently removed for reuse. Yet another problem is that the tapered dowel plug, together with the cutout piece, may fall into the interior of a wall where it cannot be recovered.

OBJECTS OF THE INVENTION

It is an object of this invention to disclose an apparatus which utilizes a thin disc, and a disc bias means to center and maintain the drill bit in an existing hole. It is an object of this invention to disclose an apparatus which is simple and inexpensive to manufacture, and lightweight to carry around. The disc bias means adequately maintains the disc in the existing hole only during use; subsequently the disc is readily removed for reuse. Additionally, compared to other technologies, the thin disc is less likely to break the drill bit if the drill bit twists out of axial alignment when the hole cutter catches in the workpiece. It is yet a final object of this invention to disclose an apparatus which employs a retention means to prevent the hole enlargement apparatus from falling into the interior of a wall, where it would be practically unretrievable.

One aspect of this invention provides for a hole enlargement apparatus used to increase the diameter of an existing hole in a workpiece for use in conjunction with a conventional large hole cutter of the type having a cylindrical cup having a toothed peripheral rim, a hub axially secured in a bottom portion of the cup, and a pilot bit axially and removably secured through the hub and cup. The hole enlargement apparatus comprises: a guide member having a disc portion dimensioned to matingly fit within the existing hole, a rim portion connected to a rear portion of the disc portion adapted to seat on the workpiece, and a disc center guide opening dimensioned to slidingly accept a shaft the diameter of the pilot bit; a drill bit replacement shaft having a hub end portion and an opposite disc end portion; disc retention means carried by the disc end portion of the drill replacement shaft to prevent the guide member from sliding off the disc end portion of the shaft; and, a spring to bias and maintain the disc portion in the existing hole. In use the guide member is selected to mate within the existing hole and then slid onto the drill replacement shaft; the disc bias means is next slid onto the shaft; and then the shaft is inserted through and secured in the hub carrying the toothed cup having the desired diameter of the enlarged hole; so that the disc portion of the guide member may be fitted into the existing hole and so that the rim portion seats around the existing hole; so that when forward rotational thrust is applied to the drill bit replacement shaft the guide member will be biased and maintained in the existing hole and the rotating peripheral teeth will cut the enlarged hole.

In a preferred aspect of this apparatus the peripheral edge of the disc portion of the guide member is tapered to ensure a tight fit within and accommodate minor variations in the existing hole size.

Various other objects, advantages and features of this invention will become apparent to those skilled in the art from the following description in conjunction with the accompanying drawings.

FIGURES OF THE INVENTION

Figure 1:
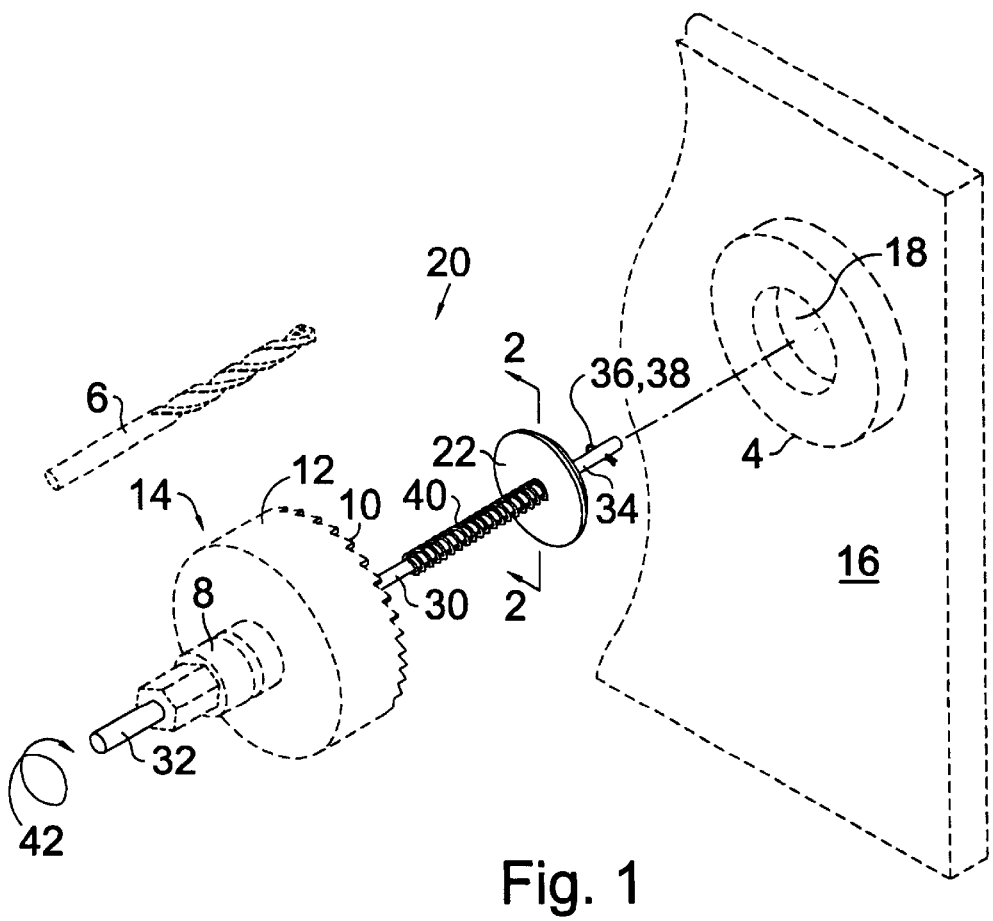
FIG. 1 is a perspective view of a hole enlargement apparatus being used to enlarge an existing hole in a workpiece.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a hole enlargement apparatus 20 being used to enlarge an existing hole 18 in a workpiece 16. The hole enlargement apparatus 20 is used to increase the diameter of an existing hole 18. It is used in conjunction with a conventional large hole cutter 14 of the type having a cylindrical cup 12 having a toothed peripheral rim 10, a hub 8 axially secured in a bottom portion of the cup 12, and a pilot bit axially and removably secured through the hub 8 and cup 12.

Figure 2:
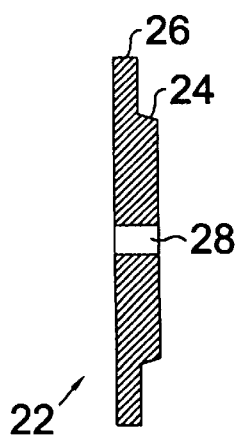
FIG. 2 is a cross sectional view of a guide member as viewed along line 2—2 on FIG. 1.

FIG. 2 is a cross sectional view of a guide member 22 as viewed along line 2—2 on FIG. 1. The hole enlargement apparatus 20 comprises a guide member 22 having a disc portion 24 dimensioned to matingly fit within the existing hole 18, a rim portion 26 connected to a rear portion of the disc portion 24 which is adapted to seat on the workpiece 16 around the hole 18 to align and maintain the disc portion 24 in the hole 18, and a disc center guide opening 28 dimensioned to slidingly accept the pilot bit 6.

The hole enlargement apparatus 20 also comprises a drill bit replacement shaft 30 having a hub end portion 32 and an opposite disc end portion 34. The disc retention means 36 carried by the disc end portion 34 of the drill replacement shaft 30 prevents the guide member 22 from sliding off the disc end portion 34 of the shaft 30. A disc bias means which most preferably is a spring 40 to biases and maintains the disc portion 24 in the existing hole 18.

To use the hole enlargement apparatus 20 a guide member 22 is selected to mate within the existing hole 18 and then slid onto the drill replacement shaft 30. The spring 40 is next slid onto the shaft 30. Then the shaft 30 is inserted through and secured in the hub 8 carrying the toothed cup 12 having the desired diameter of the enlarged hole 4, so that the disc portion 24 of the guide member 22 may be fitted into the existing hole 18 so that the rim portion 26 seats around the existing hole 18; so that when forward rotational thrust 42 is applied to the drill bit replacement shaft 30 the guide member 22 will be biased and maintained in the existing hole 18 and the rotating peripheral teeth 10 will cut the enlarged hole 4.

In a preferred embodiment of the invention the hub end portion 32 of the drill bit replacement shaft 30 is hexagonal to facilitate holding, and the disc retention means 36 comprises a cotter pin 38. Additionally the peripheral edge of the disc portion 24 of the guide member 22 is tapered to ensure a tight fit within and accommodate minor variations in the existing hole size 18.

Figure 3:
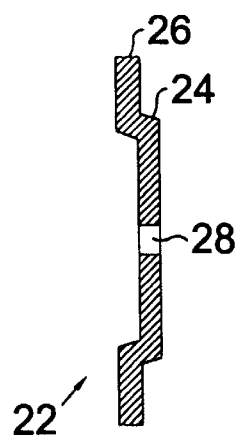
FIG. 3 is a cross sectional view of an alternative embodiment of the guide member.

FIG. 2 is a cross sectional view of a guide member 22 which is fabricated from sheet plastic material (not shown). FIG. 3 is a cross sectional view of an alternative embodiment of the guide member 22. In FIG. 3 the guide member 22 shown is stamped from sheet metal (not shown). Guide members 22 stamped from sheet metal would be lighter, more compact to store in sets, and thinner than guide members 22 fabricated from plastic.

Electrical and plumber hole saws are sold in sets (not shown) for either thin wall metallic tubing or rigid, heavy wall pipe. Each of the sets have ten cylindrical cups 12 ranging from ½" through 4". The pilot bits 6 in both of these sets are ¼" in diameter. Accordingly, drill bit replacement shafts 30 would also be ¼" in diameter. In both of the thin wall metallic tubing or rigid, heavy wall pipe sets diameters larger or equal to 2" are the same.

Figure 4:
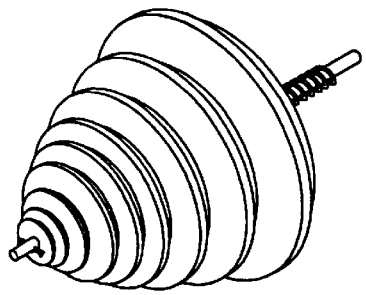
FIG. 4 is a perspective view of the hole enlargement apparatus assembled in a portable storage position.

FIG. 4 is a perspective view of a hole enlargement apparatus comprising a set of guide members 22. It is contemplated that hole enlargement apparatuses 20 would be sold in sets for either thin walled tubing or rigid pipe. Each set of hole enlargement apparatuses would comprise nine guide members sized to center within all but the largest hole in the hole saw set. In order to conveniently carry and store the set of hole guide members 22 the drill bit replacement shaft 30 would have sufficient length to simultaneously carry all guide members 22 and the spring 38 in the set.

While the invention has been described with preferred specific embodiments thereof, it will be understood that this description is intended to illustrate and not to limit the scope of the invention, which is defined by the following claims.

I claim:

1. A hole enlargement apparatus used to increase the diameter of an existing hole in a workpiece for use in conjunction with a conventional large hole cutter of the type having a cylindrical cup having a toothed peripheral rim, a hub axially secured in a bottom portion of the cup, and a pilot bit axially and removably secured through the hub and cup, comprising:

a guide member having a disc portion dimensioned to matingly fit within the existing hole, a rim portion connected to a rear portion of the disc portion adapted to seat on the workpiece around the hole to align and maintain the disc portion in the hole, and a disc center guide opening dimensioned to slidingly accept a shaft the diameter of the pilot bit;

a drill bit replacement shaft having a hub end portion and an opposite disc end portion;

disc retention means carried by the disc end portion of the drill bit replacement shaft to prevent the guide member from sliding off the disc end portion of the shaft; and, a disc bias means to bias and maintain the disc portion in the existing hole.

2. An apparatus as in claim 1 wherein the disc bias means comprises a spring.

3. A method of enlarging the diameter of an existing hole in a workpiece for use in conjunction with a conventional large hole cutter of the type having a cylindrical cup having a toothed peripheral rim, a hub axially secured in a bottom portion of the cup, and a pilot bit axially and removably secured through the hub and cup, comprising the following steps:

replacing the pilot bit with a drill bit replacement shaft having a hub end portion and an opposite disc end portion, said disc end portion having a disc retention means;

selecting a guide member having a disc portion dimensioned to matingly fit within the existing hole, a rim portion connected to a rear portion of the disc portion adapted to seat on the workpiece around the hole to align and maintain the disc portion in the hole, and a disc center guide opening dimensioned to slidingly accept a shaft the diameter of the pilot bit;

sliding the selected guide member onto the drill bit replacement shaft;

then sliding a disc bias means onto the drill bit replacement shaft to bias and maintain the disc portion into the existing hole; and then, inserting the shaft through and securing the shaft in the hub carrying the toothed cup having the desired diameter of the enlarged hole; and then, fitting the guide member into the existing hole so that the rim portion seats around the existing hole; and finally, applying forward rotational thrust to the drill bit replacement shaft thereby biasing and maintaining the guide member in the existing hole and cutting the enlarged hole with the rotating peripheral teeth;

so that after the enlarged hole is cut through, the guide member is retained on the drill bit replacement shaft.

4. An apparatus as in claim 2 wherein the disc retention means comprises a cotter pin.

5. An apparatus as in claim 1 wherein the guide member is fabricated from a sheet of plastic material.

6. An apparatus as in claim 1 wherein the guide member is stamped from sheet metal.

7. An apparatus as in claim 2 wherein the peripheral edge of the disc portion of the guide member is tapered to ensure a tight fit within and accommodate minor variations in the existing hole size.

8. An apparatus as in claim 7 further comprising additional guide members sized to center within all but the largest hole in a standard thin wall hole saw set.

9. An apparatus as in claim 7 further comprising additional guide members sized to center within all but the largest hole in a standard rigid, heavy wall hole saw set.

10. An apparatus as in claim 8 wherein the drill bit replacement shaft has sufficient length to simultaneously carry all guide members and the spring for the thin wall hole saw set.

11. An apparatus as in claim 9 wherein the drill bit replacement shaft has sufficient length to simultaneously carry all guide members and the spring for the rigid, heavy wall hole saw set.

* * * * *